United States Patent Office 3,047,128
Patented July 31, 1962

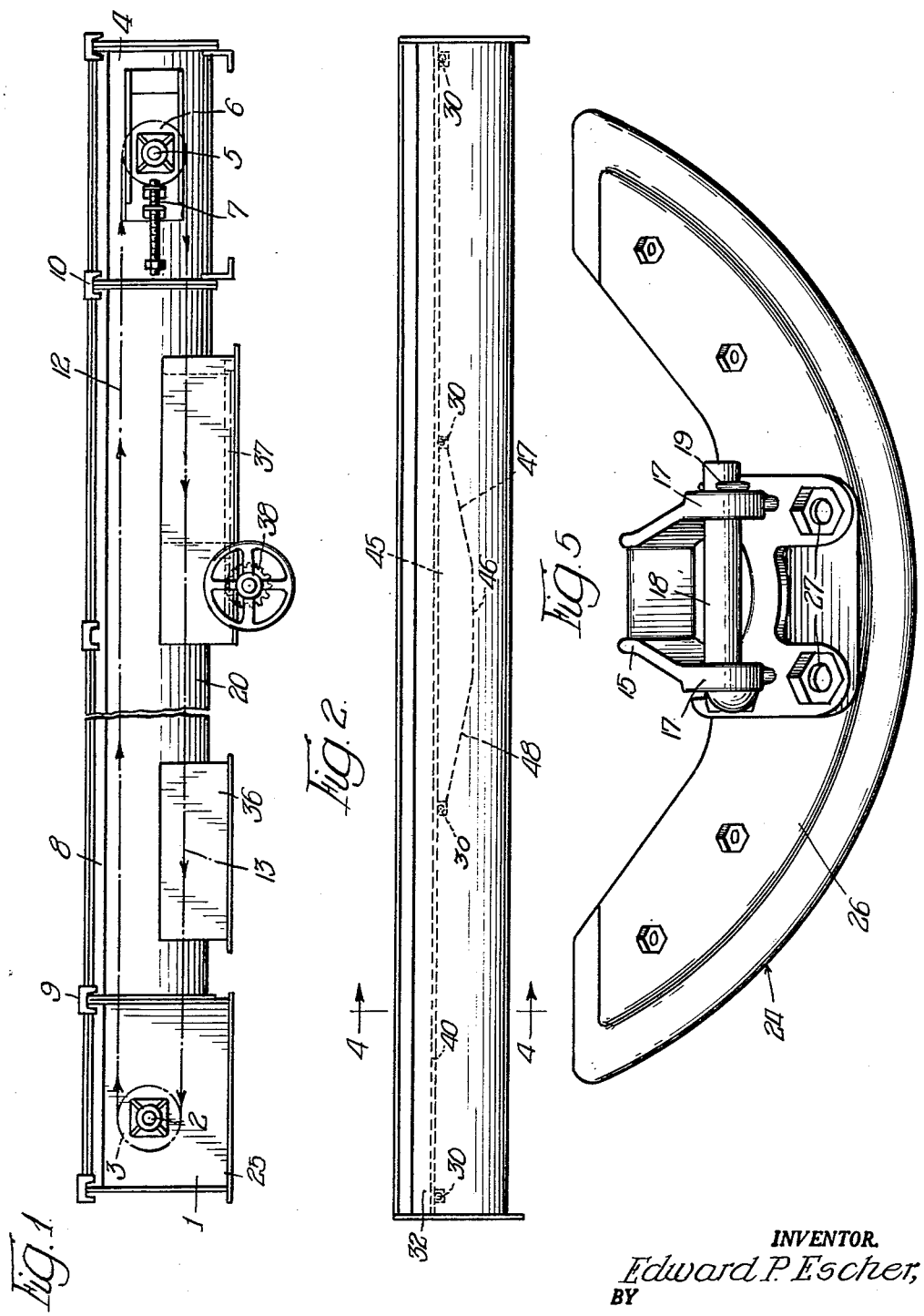

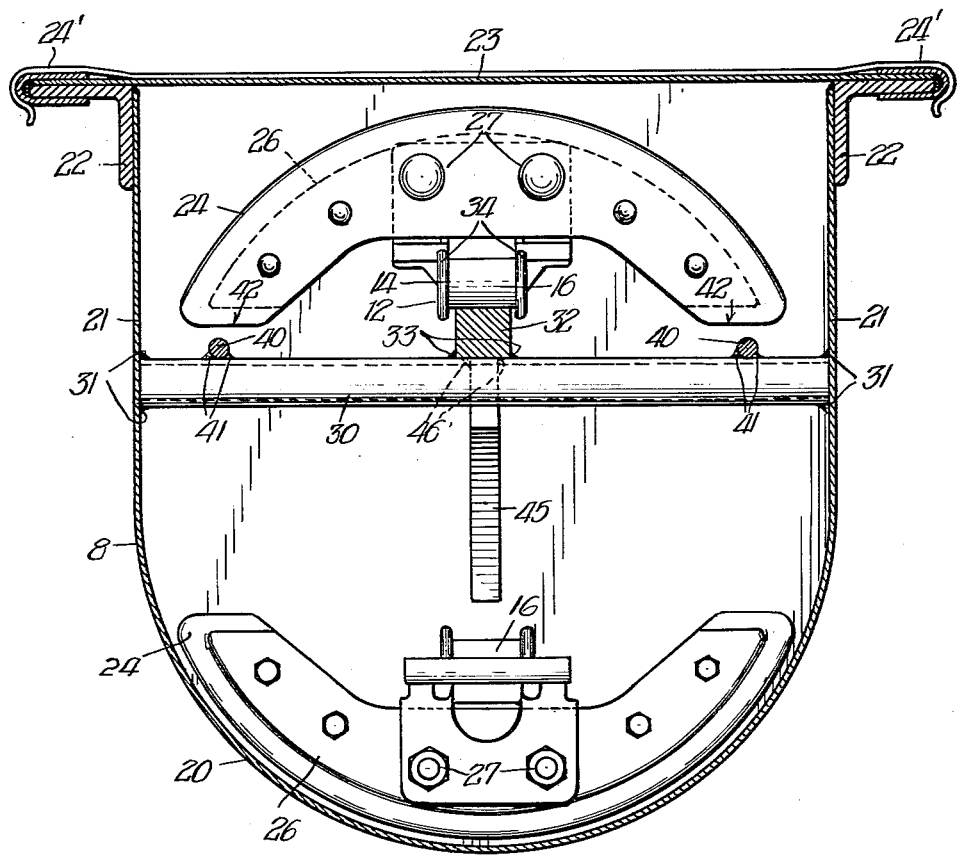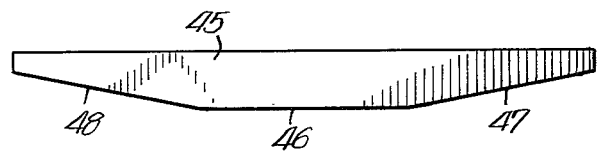

3,047,128
PUSHER-TYPE CONVEYOR
Edward P. Escher, Flossmoor, Ill., assignor to Screw Conveyor Corporation, Hammond, Ind., a corporation of Illinois
Filed Oct. 28, 1959, Ser. No. 849,306
5 Claims. (Cl. 198—174)

This invention relates, in general, to conveying apparatus and has particular relation to endless chain or belt type conveyors for horizontal and inclined conveying of grain, flour, feed, chemicals, coffee, starch, sugar, salt, fertilizers, aggregates and other free-flowing materials.

In general, such conveyors comprise an endless power driven chain, belt or the like, with attached flights and with the lower run of the chain or belt and the attached flights operating in the bottom of a conveyor trough to move or convey the material along the trough either horizontally or at an incline.

With prior structures, the lower run of the endless chain or belt and its attached flights tend to ride up or rise out of the volume of material being conveyed, particularly in handling, for example, steeped materials, such as corn, or wet, moist or heavy materials, cement, fine coal and other materials. Any such riding up or rise of the lower run of the chain, belt, or the like and its attached flights reduces the conveying action and tends to leave unconveyed material in the bottom of the trough.

Moreover, any such riding up or rise of the flights along the lower run of the endless chain, belt or the like may cause the flights to engage fixed supports or other parts within the conveyor trough. This may result in breaking off the corners of the flights, or otherwise injuring the flights, or in jamming or blocking the operation of the conveyor.

The broad concept of the present invention resides in the provision of hold-down means for keeping the flights along the lower run of the chain, belt, or the like properly positioned at all times in the volume of the material being conveyed and against objectionable or unreasonable riding up or rise of these flights out of the volume of the material.

Another object is the provision of hold-down means of the character set forth which does not present ledges or the like along which the material being conveyed will collect.

Another object is the provision of hold-down means which accomplishes its desired purpose by engagement or co-operation with the endless chain, belt, or the like.

Another object is the provision of hold-down means of the character set forth which is welded or otherwise secured to a continuous guide bar for supporting the return run of the endless chain, belt, or the like.

Another object is the provision of a hold-down bar which may be located as desired along the length of the conveyor trough and which has a lower hold-down portion intermediate its ends and is tapered upwardly in both directions from such lower hold-down portion so that the bar will act as set forth when the endless belt, chain or the like is moving in one direction and similarly when the endless belt, chain or the like is reversed and driven in the opposite direction.

Another object is the provision of an improved form of guide bar for supporting the return run of the endless chain, belt or the like.

Another object is the provision of flight support means for preventing or limiting tipping of the flights, particularly along the upper or return run of the endless chain, belt, or the like; and also for preventing the endless chain, belt, or the like from getting off the guide bar, or the flights from getting below fixed supports or other parts within the conveyor trough, which might result in breaking or injuring the flights or jamming or blocking the operation of the conveyor.

Further features and numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 1 is a longitudinal diagrammatic view showing one form of conveyor with which the present invention may be employed;

FIGURE 2 is a side view of an intermediate trough section embodying hold-down means, return run support, and flight support, or flight tipping preventing or limiting means according to the present invention;

FIGURE 3 is a side view of a hold-down bar according to the present invention;

FIGURE 4 is a transverse sectional view taken along the line 4—4 of FIGURE 2; and FIGURE 5 is a detailed view showing another link of the endless chain which is connected, for example, to the upper link shown in FIGURE 4, and also showing the attachment of the flight to the link.

Referring now to the drawings, the conveyor illustrated in FIGURE 1 comprises a standard head section 1 fitted with a shaft 2 bearings and a driving sprocket 3.

The tail section 4 comprises a tail shaft 5, sprocket 6, and take-up 7 which may be of standard or any other desired form.

The intermediate trough section, or sections, 8 are attached at opposite ends to the head sections 1 at 9 and to the tail section 4 at 10. Where there are more than one intermediate sections 8 their adjacent ends are attached together, as well understood in the art.

The conveyor comprises an endless chain, belt, or the like 12 trained about the sprockets 3 and 6 and driven in the direction indicated by the arrows 13 in FIGURE 1. If desired, the endless chain 12, or the like, may be reversed and driven in the opposite direction.

While a roller chain, cable, or other form of endless belt, or the like, may be employed, the chain selected for illustration is of the pintle type comprising a plurality of pivotally connected links 14 and 15. The apertured generally tubular part 16 of the link 14 shown at the top in FIGURE 4 fits between the apertured parts 17 of the link 15 shown in FIGURE 5 and the links are pivotally connected by a pintle pin 18 which passes through the apertures in the parts 17 and the tubular part 16 and is fastened against endwise displacement, for example, by a cotter pin 19.

The trough sections 8 are standard U-shaped troughing, preferably galvanized and fitted together in the usual or any desired manner. The bottom of the trough is rounded at 20. Welded or otherwise secured to the upper portions of the outer surfaces of the sides 21 of the trough 8 are angle members 22. The top of the trough may be closed by cover plates 23 clamped and dust-sealed by clamping and dust-sealing means 24′, which may be of the form more fully disclosed in United States Letters Patent No. 2,459,770, Edward P. Escher, patented January 18, 1949.

The material which is to be handled by the conveyor may be delivered into the top of the trough, for example, by a spout (not shown) located as desired. The endless chain 12 has attached flights 24 which when the chain is driven in the direction indicated by the arrow 13 in FIGURE 1 conveys the material along the trough toward the left, as viewed in FIGURE 1 to the head section 1. The bottom of the head section 1 is open at 25, and the material is discharged downwardly through this opening.

The flights 24 are preferably formed of tough nonmetallic material having backing plates 26 and attached to the chain links, for example, by screws and nuts as illustrated at 27 in FIGURE 4. The flights 24 are uniquely shaped and carry a deep load either horizontally or at any reasonable incline. The shape of the flights fits the contour of the trough and gives a positive wiping and cleaning action. And they are smooth and quiet in operation, and have long wearing quality.

Disposed transversely between the sides 21 of the trough 8, at longitudinally spaced locations as shown in FIGURE 2, are cross steel guide supports 30. These guides supports 30 are shown in the form of pipes or of tubular form, but this may vary. The supports 30 are shown as welded at their opposite ends at 31 to the sides of the trough 8. This too may vary. For example, instead of welding the ends of the supports 30 to the trough, the supports 30 may be bolted in place, for example, by a rod extending through the pipes 30 with nuts threaded on the ends of the rods and against the outer surfaces of the sides 21 of the trough.

The upper or return run of the chain 12 is supported by a guide bar 32. This bar 32 is continuous longitudinally through the length of the trough and extends longitudinally across the upper surfaces of the guide supports 30 centrally between the opposite ends thereof. The bar 32 may be formed, for example, of mild steel and is attached to the supports 30, for example, by welding at 33, or otherwise as desired. The tubular portions 16 of the chain links 14 ride upon the upper surface of the bar 32 and the upper portion of the bar 32 is disposed between the flanges 34 at the ends of the tubular portions 16. Thus, there is no sag of the conveyor chain at any point.

While discharge from the trough has been described as through the open bottom of the head section 1, it is to be understood that discharge from the trough may be at any point desired. If slide gates are required, they may be either flat or curved, and/or rack and pinion operated, or operated by manipulating a chain from below or from remote position or by an oil cylinder from remote position, or otherwise as desired. An additional discharge with handslides is shown at 36 in FIGURE 1, and an additional discharge 37, curved or flat, with a rack and pinion 38 for operating the same, is shown in the same figure.

Also continuous longitudinally through the length of the trough are a pair of flight supports, or flight support rods 40, or balancing members, one between each of the opposite sides of the guide bar 32 and the proximate sides of the trough. The flight supports 40 may be formed of cold finished stock, and are attached to the underlying supports 30, for example, by welding at 41 or otherwise as desired.

One of the longitudinal flight supports 40 is disposed beneath each of the downwardly directed surfaces 42 at the opposite ends of the flights 24 along the return run of the chain 12. As thus disposed, the supports 40 prevent or limit tipping of the flights 24 in amount which would permit the endless chain 12 from getting off the guide bar 32, or which would permit the ends of the flights from getting below the cross supports 30 or other parts, which might result in breaking or injuring the flights, or jamming or blocking the operation of the conveyor.

A hold-down bar 45 is provided for keeping the flights 24 along the lower or conveying run of the chain 12 properly positioned at all times in the volume of the material being conveyed, and against objectionable riding up or rise of the flights 24 out of the volume of the material. The bar 45 is located centrally between the sides of the trough, as illustrated in FIGURE 4 and, for example, longitudinally between the two intermediate cross guide supports 30 as illustrated in FIGURE 2. The upper edge of the bar 45 is attached to the guide bar 32, for example, by welding at 46', or otherwise as desired.

As shown in dotted lines in FIGURE 2, and in FIGURE 3, the lower edge of the bar 45 has a lower hold-down portion 46 positioned intermediate the opposite ends thereof. This hold-down portion 46 overlies the tubular portions 16 of the chain links 14 in spaced relation upwardly thereof. If the flights ride upwardly or rise from the material being conveyed, the chain 12 thus engages or coacts with the hold-down bar 45 and the flights 24 are thus held properly in the volume of the material. The flights are thus at all times kept in the volume of the material and carry a deep load either horizontally or at any reasonable incline.

The lower edge of the particular hold-down bar 45 selected for illustration is tapered upwardly at 47 and 48 in opposite directions from the lower hold-down portion 46. As a result, the hold-down bar 45 will act as set forth when the endless chain 12 is traveling in the direction indicated by the arrow 13 in FIGURE 1, and it will act similarly if the endless chain 12 is reversed and driven in the opposite direction.

The coaction of the hold-down bar 45 with the chain 12 effectively accomplishes the desired results, and no ledges or the like are presented along which the material being conveyed would collect. All sharp edges of the bar 12 are preferably eliminated by grinding, and thus smooth and effective coaction with the links of the chain is provided.

While the hold-down surface 46 is not continuous longitudinally in the illustrated embodiment of the invention, it is to be understood that hold-down means with a longitudinally continuous hold-down surface is contemplated within the scope of the broader aspects of the present invention.

The embodiment of the invention disclosed in the drawings and the specification is for illustrative purposes only, and it is to be expressly understood that said drawings and the specification are not to be construed as a definition of the limits or scope of the invention reference being had to the appended claims for that purpose.

I claim:

1. A conveyor for conveying free-flowing materials comprising a conveyor trough having a bottom and spaced upright sides, an endless conveyor trained about sprockets and having upper and lower runs operable within said trough, flights attached to said conveyor, the flights along the lower run operating to move the material longitudinally along the bottom of said trough and the upper run constituting the return run of the conveyor, longitudinally spaced guide supports extending transversely between and secured to said upright sides of said trough with the space within said trough along the upper run of the conveyor in open communication with the bottom of said trough through the spaces between said guide supports, said flights being disposed in generally vertical planes along the upper and lower runs of the conveyor with the lower edges of the flights along the upper run directed downwardly toward and spaced above said guide supports, an upper guide bar extending longitudinally within said trough over said spaced guide supports and secured thereto, said guide bar cooperating with the upper run of the endless conveyor to support the same in its movement above said guide supports, and a straight hold-down bar disposed longitudinally within said trough between the upright sides thereof and beneath and secured to said guide bar, said hold-down bar depending downwardly into close spaced proximity to the lower run of the conveyor and coacting with said lower run of the conveyor to prevent undue rise of the flights along the lower run of the conveyor from the volume of material in the bottom of the conveyor trough.

2. A conveyor according to claim 1, wherein the endless conveyor comprises a pintle chain having tubular chain link connecting portions with which the longitudinally disposed lower edge of the hold-down bar coacts to prevent undue rise of the lower edges of the flights from the volume of material in the bottom of the trough.

3. A conveyor according to claim 1, wherein the longitudinally disposed lower edge of the hold-down bar has a straight lower hold-down edge and is inclined upwardly in opposite directions from said lower hold-down edge to act in each of the opposite directions of movement of a reversible conveyor.

4. A conveyor according to claim 1, wherein the bottom of the conveyor trough is rounded transversely and the flights have correspondingly rounded edges to match the rounded contour of the bottom of said trough, said rounded edge flights having generally horizontal end edges directed downwardly toward said guide supports along the upper run of the conveyor, and continuous flight stop rods extending longitudinally over said guide supports and secured directly to said guide supports beneath said generally horizontal end edges of said flights to prevent tipping of the flights along the upper run of the conveyor in amount which would permit the ends of the flights getting below the longitudinally spaced and transversely disposed guide supports.

5. A conveyor for conveying free-flowing materials comprising a conveyor trough having a bottom and spaced upright sides, an endless conveyor trained about sprockets and having upper and lower runs operable within said trough, flights attached to said conveyor, the flights along the lower run operating to move the material longitudinally along the bottom of said trough and the upper run constituting the return run of the conveyor, longitudinally spaced guide supports extending transversely between and secured to said upright sides of said trough with the space within said trough along the upper run of the conveyor in open communication with the bottom of said trough through the spaces between said guide supports, said flights being disposed in generally vertical planes along the upper and lower runs of the conveyor with the lower edges of the flights along the upper run directed downwardly toward and spaced above said guide supports, an upper guide bar extending longitudinally within said trough over said spaced guide supports and secured thereto, said guide bar cooperating with the upper run of the endless conveyor to support the same in its movement above said guide supports, a straight hold-down bar disposed longitudinally within said trough between the upright sides thereof and beneath and secured to said guide bar, said hold-down bar depending downwardly into close spaced proximity to the lower run of the conveyor and coacting with said lower run of the conveyor to prevent undue rise of the flights along the lower run of the conveyor from the volume of material in the bottom of the conveyor trough, and longitudinally continuous stop members extending over and secured directly to said guide supports, said stop members being positioned for direct cooperation with the lower edges of the ends of said flights to prevent tipping of the flights along the upper run of the conveyor in amount which would permit the lower edges of the ends of the flights getting below said guide supports.

References Cited in the file of this patent

UNITED STATES PATENTS

| | | |
|---|---|---|
| 795,166 | Piez | July 18, 1905 |
| 811,190 | Webster | Jan. 30, 1906 |
| 1,149,647 | Harwood | Aug. 10, 1915 |
| 1,197,345 | Cleven et al. | Sept. 5, 1916 |
| 1,744,933 | Thoen | Jan. 28, 1930 |
| 1,922,972 | Miller | Aug. 15, 1933 |
| 2,382,619 | Earp | Aug. 14, 1945 |
| 2,403,024 | Rixon | July 2, 1946 |
| 2,459,770 | Escher | Jan. 18, 1949 |
| 2,769,525 | Herscovitch | Nov. 6, 1956 |

FOREIGN PATENTS

| | | |
|---|---|---|
| 700,924 | Great Britain | Dec. 16, 1953 |